(12) United States Patent
Harris

(10) Patent No.: US 7,583,054 B1
(45) Date of Patent: Sep. 1, 2009

(54) PORTABLE POWER SUPPLY AND RECHARGING APPARATUS

(76) Inventor: James J. Harris, 413 Concord Ave., St. Marys, OH (US) 45885

( * ) Notice: Subject to any disclaimer, the term of this patent is extended or adjusted under 35 U.S.C. 154(b) by 591 days.

(21) Appl. No.: 10/914,067

(22) Filed: Aug. 9, 2004

(51) Int. Cl.
*H01M 10/46* (2006.01)
(52) U.S. Cl. .................................... 320/107
(58) Field of Classification Search ............. 320/107, 320/110, 112, 116, 111
See application file for complete search history.

(56) References Cited

U.S. PATENT DOCUMENTS

| | | | |
|---|---|---|---|
| 4,829,224 A | 5/1989 | Gandelman et al. | |
| 5,160,879 A | 11/1992 | Tortola et al. | |
| D340,027 S | 10/1993 | Tortola | |
| 5,340,662 A * | 8/1994 | McCarter | 429/101 |
| 5,510,691 A | 4/1996 | Palatov | |
| 5,652,499 A | 7/1997 | Morita et al. | |
| 5,694,022 A | 12/1997 | Ranta et al. | |
| D446,497 S | 8/2001 | Yu | |
| 6,501,246 B2 * | 12/2002 | You et al. | 320/114 |
| 6,528,969 B2 * | 3/2003 | Tung et al. | 320/103 |
| 6,821,670 B2 * | 11/2004 | Hsueh | 320/103 |
| 2002/0149343 A1 * | 10/2002 | Huang | 320/112 |

* cited by examiner

*Primary Examiner*—Edward Tso

(57) ABSTRACT

A portable power supply and recharging apparatus includes a housing that has a bottom wall and a peripheral wall that is attached to and extends upwardly from the bottom wall. The peripheral wall has an upper edge defining an opening into the housing. A cover is selectively coupled to the peripheral wall such that the cover closes the opening. A plurality of electrical contacts is mounted within the housing. The contacts are electrically coupled in series. A plurality of batteries is each removably positioned in the housing and each is in electrical connection with the electrical contacts. Each of a pair of female plugs adapted for receiving a male lighter plug is mounted in the peripheral wall. Each of the female plugs is electrically coupled to the electrical contacts. The male plug of electrical equipment may be selectively coupled to one of the female plugs.

7 Claims, 3 Drawing Sheets

PORTABLE POWER SUPPLY AND RECHARGING APPARATUS

BACKGROUND OF THE INVENTION

1. Field of the Invention

The present invention relates to power supply devices and more particularly pertains to a new power supply device for recharging portable electronics.

2. Description of the Prior Art

The use of power supply devices is known in the prior art. U.S. Pat. No. 5,160,879 describes a device for holding rechargeable batteries and which includes and male pin for recharging devices which typically rely on an AC adapter. Another type of power supply device is U.S. Pat. No. 4,829,224 that combines a battery pack with the appropriate power cords to recharge a cellular phone.

While these devices fulfill their respective, particular objectives and requirements, the need remains for a device that supplies 12-volt power which can be utilized by a male lighter plug. Generally, these types of plugs are used for powering cell phones, portable radios, GPS units, PDAs and other small personal electronics by electrically coupling them to the female lighter port of a vehicle. These devices utilize the 12-volt battery source of the vehicle. However, when a person is not in a vehicle, such as while camping, fishing, flying in a small plane or the like, a recharging source is not available for these devices that are well adapted for being recharged using a 12-volt source. For this reason, a portable power supply is needed that is adapted for powering these various electronics by the inclusion of a female lighter plug.

SUMMARY OF THE INVENTION

The present invention meets the needs presented above by generally comprises a housing that has a bottom wall and a peripheral wall that is attached to and extends upwardly from the bottom wall. The peripheral wall has an upper edge defining an opening into the housing. A cover is selectively coupled to the peripheral wall such that the cover closes the opening. A plurality of electrical contacts is mounted within the housing. The contacts are electrically coupled in series. A plurality of batteries is each removably positioned in the housing and each is in electrical connection with the electrical contacts. Each of a pair of female plugs adapted for receiving a male lighter plug is mounted in the peripheral wall and has a male plug receiving opening extending outwardly of the peripheral wall. Each of the female plugs is electrically coupled to the electrical contacts. The male plug of electrical equipment may be selectively coupled to one of the female plugs.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
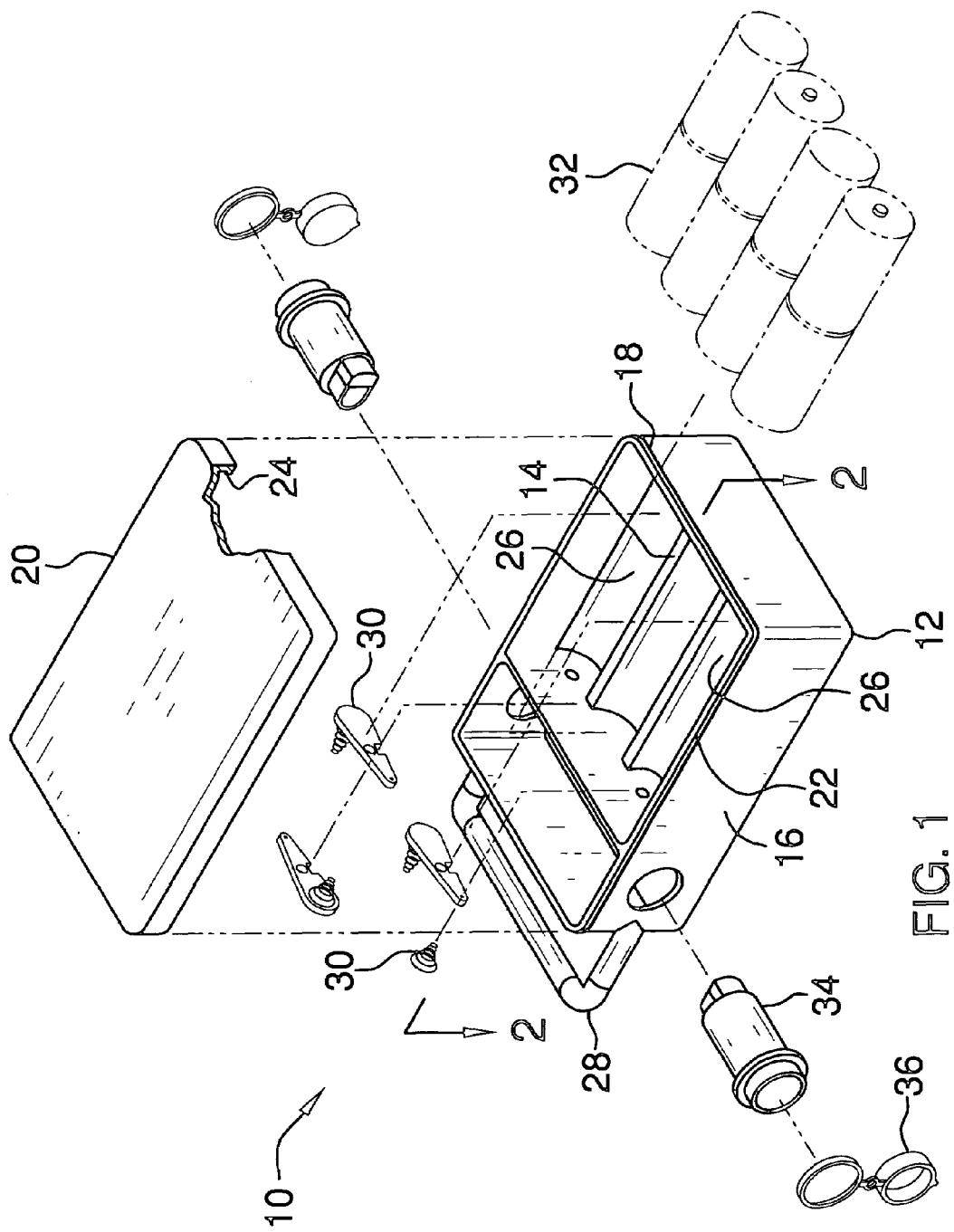
FIG. 1 is a perspective view of a portable power supply and recharging apparatus according to the present invention.
Figure 2:
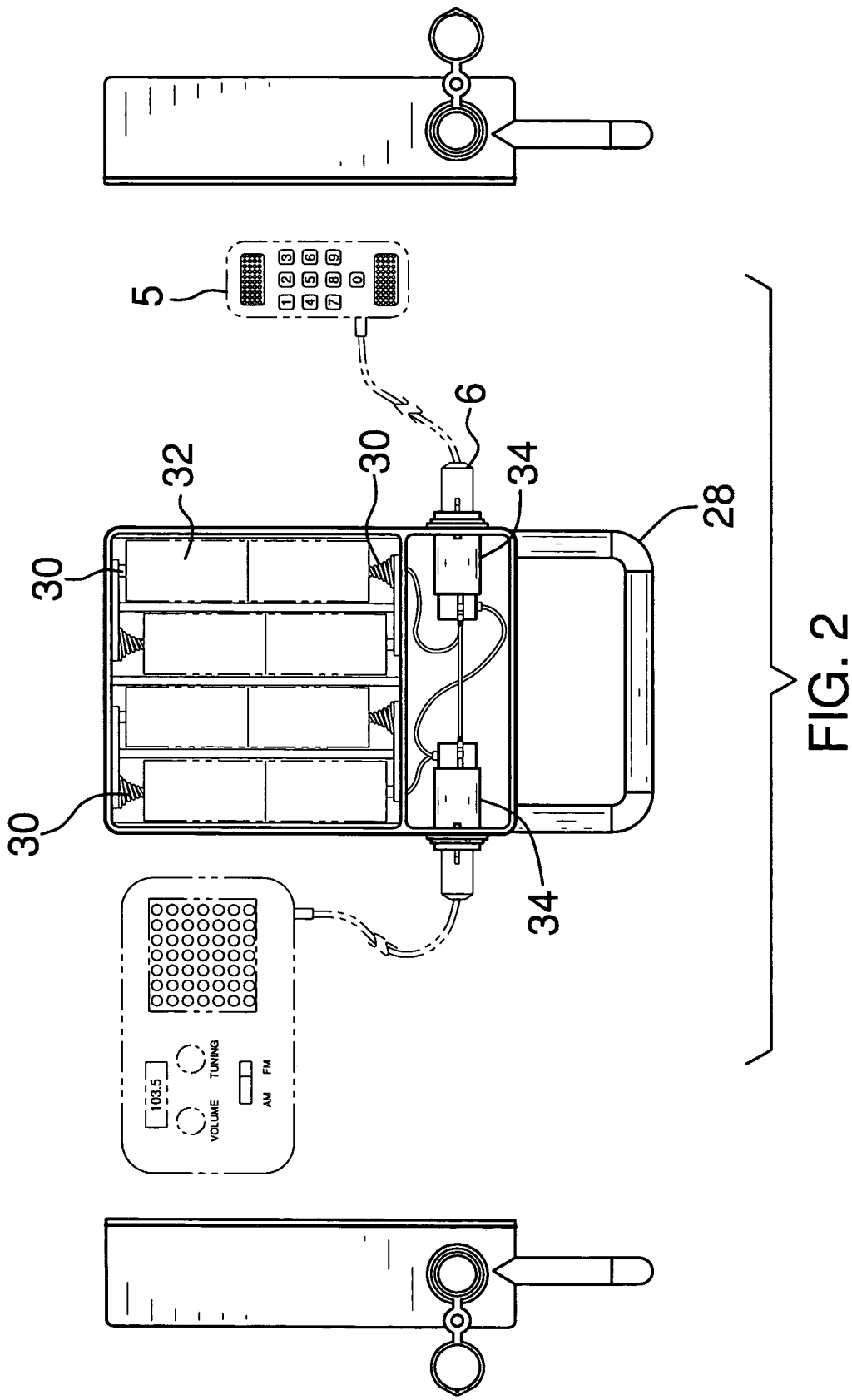
FIG. 2 is a top view taken along line 2-2 of FIG. 1 of the present invention.
Figure 3:
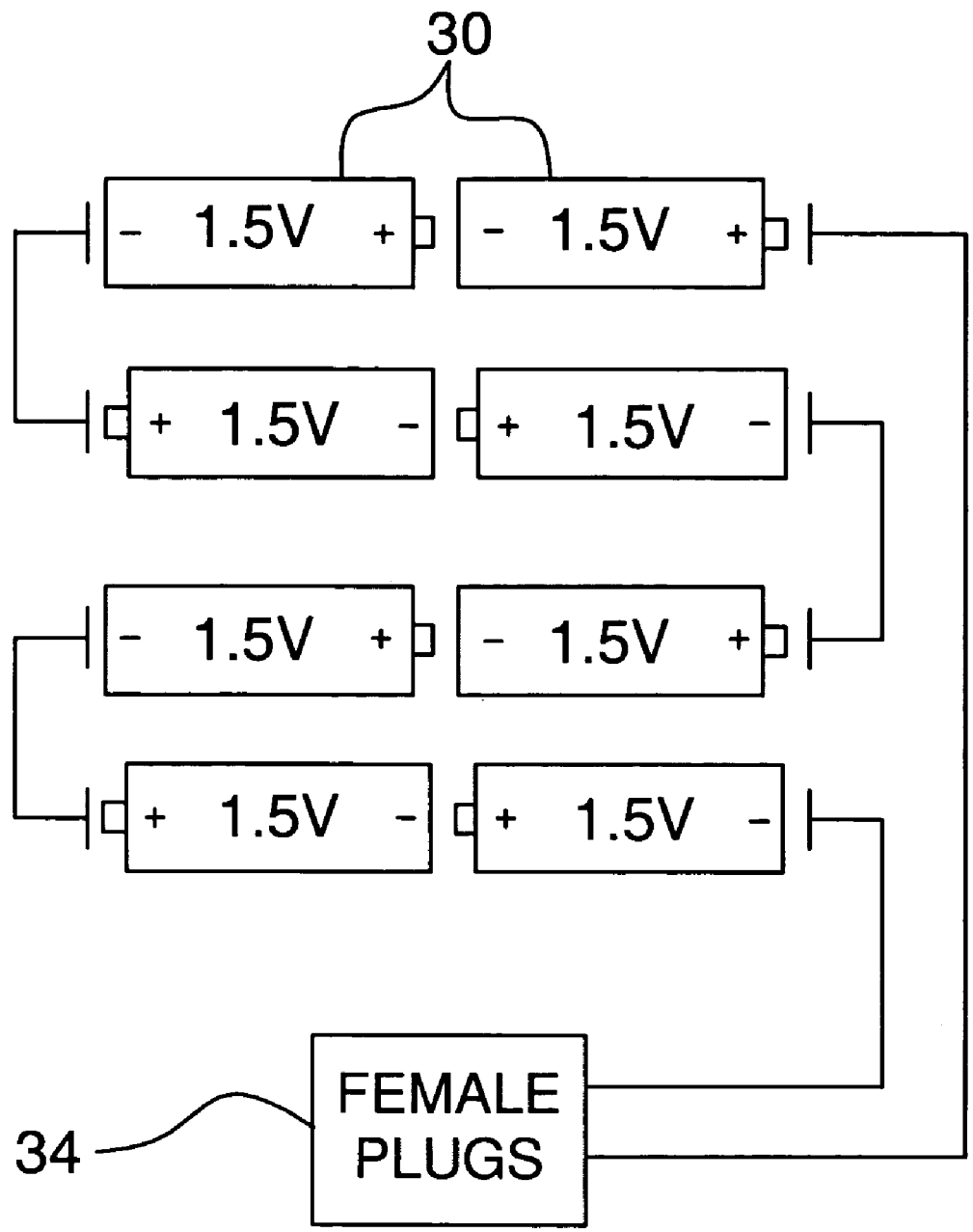
FIG. 3 is an electronic schematic view of the present invention.

With reference now to the drawings, and in particular to FIGS. 1 through 3 thereof, a new power supply device embodying the principles and concepts of the present invention and generally designated by the reference numeral 10 will be described.

As best illustrated in FIGS. 1 through 3, the portable power supply and recharging apparatus 10 generally comprises an auxiliary power supply assembly for electric equipment 5 adapted for receiving electricity from a 12-volt source from a male lighter plug 6. Such male plugs 6 are conventionally used for electrically coupling electronic devices to a car battery through the lighter port.

A housing 12 is provided that has a bottom wall 14 and a peripheral wall 16 that is attached to and extends upwardly from the bottom wall 14. The peripheral wall 16 has an upper edge 18 defining an opening into the housing 12. A cover 20 is selectively coupled to the peripheral wall 16 such that the cover 20 closes the opening. The cover 20 and upper edge 18 have interlocking flanges 22, 24 for securing the cover 20 in a closed position. The bottom wall 14 has a plurality of elongated battery receiving wells 26 therein. A handle 28 is ideally attached to the peripheral wall 16.

A plurality of electrical contacts 30 are mounted within the housing 12 and positioned adjacent to the wells 26 so that there are contacts 30 at each end of each of the wells 26. The contacts 30 are electrically coupled together in series.

Each of a plurality of batteries 32 is removably positioned in one of the wells 26 such that each of the wells 26 has at least one battery, and preferably two batteries, positioned therein. Each of the batteries 32 is in electrical connection with the electrical contacts 30. The plurality of batteries 32 ideally comprises eight D cell batteries each having a 1.5-volt output.

A pair of female plugs 34 is provided. Each of the female plugs 34 is adapted for receiving a male lighter plug 6. Each of the female plugs 34 is mounted in the peripheral wall 16 and has a male plug receiving opening extending outwardly of the peripheral wall 16. The female plugs 34 are each electrically coupled to the electrical contacts 30. Caps 36 are provided that have a size adapted for selectively attaching to and covering the female plugs 34 to prevent debris from entering therein.

In use, the apparatus 10 functions as a recharging station or power station for an electronic device 5 when a vehicle's power port, or female lighter plug, is not available. The power supplies that use male lighter plugs 6 are adapted for receiving electricity from a 12-volt power source. The apparatus 10 creates such a source in a portable fashion so that a variety of different devices may be recharged with one standard power plug adapter that is adapted for plugging into a female lighter plug 34. To charge or power the electrical equipment 5, the male plug 6 of the electrical equipment 5 is coupled to one of the female plugs 34. Two female plugs 34 are utilized for allowing two pieces of electronic equipment to be powered.

The types of devices to be powered include cell phones, PDAs, personal GPS units, portable music players and the like.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An auxiliary power supply assembly for electric equipment adapted for receiving electricity from a 12-volt source from a male lighter plug, said assembly including:
   a housing having a bottom wall and a peripheral wall being attached to and extending upwardly from said bottom wall, said peripheral wall having an upper edge defining an opening into said housing, a cover being selectively coupled to said peripheral wall such that said cover closes said opening;
   a plurality of electrical contacts being mounted within said housing, said contacts being electrically coupled in series;
   a plurality of batteries each being removably positioned in said housing and being in electrical connection with said electrical contacts;
   a pair of female plugs each adapted for receiving a male lighter plug, each of said female plugs being mounted in said peripheral wall and having a male plug receiving opening extending outwardly of said peripheral wall, each of said female plugs being electrically coupled to said electrical contacts; and
   wherein the male plug of the electrical equipment may be selectively coupled to one of said female plugs.

2. The assembly according to claim 1, wherein said bottom wall has a plurality of elongated battery receiving wells therein, each of said plurality of contacts being positioned adjacent to one of said wells, wherein each of said is positioned within said wells such that each of said wells has at least one battery positioned therein.

3. The assembly according to claim 1, wherein said plurality of batteries comprises eight D cell batteries.

4. The assembly according to claim 1, further including a handle being attached to said peripheral wall.

5. The assembly according to claim 1, further including caps that that have a size adapted for selectively attaching to and covering said female plugs.

6. An auxiliary power supply assembly for electric equipment adapted for receiving electricity from a 12-volt source from a male lighter plug, said assembly including
   a housing having a bottom wall and a peripheral wall being attached to and extending upwardly from said bottom wall, said peripheral wall having an upper edge defining an opening into said housing, a cover being selectively coupled to said peripheral wall such that said cover closes said opening, said bottom wall having a plurality of elongated battery receiving wells therein;
   a plurality of electrical contacts being mounted within said housing and positioned adjacent to said wells, said contacts being electrically coupled in series;
   a plurality of batteries each being removably positioned in one of said wells such that each of said wells has at least one battery positioned therein and each of said batteries are in electrical connection with said electrical contacts, said plurality of batteries comprising eight D cell batteries;
   a pair of female plugs each adapted for receiving a male lighter plug, each of said female plugs being mounted in said peripheral wall and having a male plug receiving opening extending outwardly of said peripheral wall, each of said female plugs being electrically coupled to said electrical contacts;
   a handle being attached to said peripheral wall; and
   wherein the male plug of the electrical equipment may be selectively coupled to one of said female plugs.

7. A method of providing a power supply to electric equipment having a male lighter plug adapted to receive electricity from a 12-volt source, said method comprising the steps of:
   providing a housing having a bottom wall and a peripheral wall being attached to and extending upwardly from said bottom wall, said peripheral wall having an upper edge defining an opening into said housing, a cover being selectively coupled to said peripheral wall such that said cover closes said opening, said bottom wall having a plurality of elongated battery receiving wells therein;
   providing a plurality of electrical contacts being mounted within said housing and positioned adjacent to said wells, said contacts being electrically coupled in series;
   positioning each a plurality of batteries in one of said wells such that each of said wells has at least one battery positioned therein and each of said batteries are in electrical connection with said electrical contacts, said plurality of batteries comprising eight D cell batteries;
   providing a pair of female plugs each adapted for receiving a male lighter plug, each of said female plugs being mounted in said peripheral wall and having a male plug receiving opening extending outwardly of said peripheral wall, each of said female plugs being electrically coupled to said electrical contacts;
   providing a handle being attached to said peripheral wall;
   electrically coupling the electronic equipment to one of said female plugs.

* * * * *